United States Patent
Wundsam et al.

(10) Patent No.: US 9,935,831 B1
(45) Date of Patent: Apr. 3, 2018

(54) SYSTEMS AND METHODS FOR CONTROLLING NETWORK SWITCHES USING A SWITCH MODELING INTERFACE AT A CONTROLLER

(71) Applicant: Big Switch Networks, Inc., Mountain View, CA (US)

(72) Inventors: Andreas Wundsam, Berkeley, CA (US); Richard Leegan Lane, II, Mountain View, CA (US); Robert Wesley Sherwood, Oakland, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 37 days.

(21) Appl. No.: 14/295,196

(22) Filed: Jun. 3, 2014

(51) Int. Cl.
*H04L 12/24* (2006.01)
*H04L 12/801* (2013.01)
(Continued)

(52) U.S. Cl.
CPC .......... *H04L 41/0823* (2013.01); *H04L 47/13* (2013.01); *H04L 49/25* (2013.01); *H04L 49/351* (2013.01)

(58) Field of Classification Search
CPC ............. H04L 12/2898; H04L 12/4675; H04L 41/042; H04L 41/0668; H04L 41/0686;
(Continued)

(56) References Cited

U.S. PATENT DOCUMENTS 5,832,484 A * 11/1998 Sankaran .......... G06F 17/30362
5,914,938 A * 6/1999 Brady ............... H04L 29/12009
370/254

(Continued)

FOREIGN PATENT DOCUMENTS

JP 2014504047 A 2/2014

OTHER PUBLICATIONS

Voellmy et al., "Maple: Simplifying SDN Programming Using Algorithmic Policies", SIGCOMM, ACM, 2 Penn Plaza, Suite 701 New York NY 10121-0701 USA, Aug. 27, 2013 (Aug. 27, 2013, pp. 87-98, XP058030647, DOI: 10.1145/2486001.2486030, ISBN: 978-1-4503-2056-6.

Chiba et al., "A Study on Control Plane OAM Mechanism for OpenFlow Networks", ICIE Technical Report, Denshi Jouhou Tsuushin Gakki, JP, vol. 110, No. 448, Feb. 24, 2011 (Feb. 24, 2011), pp. 329-344, XP008173888, ISSN: 0913-5685.

(Continued)

*Primary Examiner* — Eric Nowlin
(74) *Attorney, Agent, or Firm* — Treyz Law Group, P.C.; Tianyi He; Michael H. Lyons

(57) ABSTRACT

The controller may include a switch modeling interface that maintains switch models of switches in a network. The switch modeling interface may receive a desired network configuration from application modules that respond to network events. The switch modeling interface may compare the desired network configuration with the current network configuration represented by the switch models. The switch modeling interface may generate control messages to the switches for only identified differences between the desired network configuration and the current network configuration as identified by the switch models. The differences may be identified based on digest values retrieved from the switches. The switch modeling interface may determine whether the control messages were successfully received and processed by a switch and may indicate success or failure to the application module that provided the desired network configuration.

18 Claims, 15 Drawing Sheets

(51) Int. Cl.
*H04L 12/931* (2013.01)
*H04L 12/947* (2013.01)

(58) Field of Classification Search
CPC ... H04L 41/08; H04L 41/0803; H04L 41/082;
H04L 41/0866; H04L 41/0873; H04L
41/0893; H04L 41/12; H04L 41/145;
H04L 41/20; H04L 41/5019; H04L
41/5041; H04L 41/5054; H04L 41/5058;
H04L 43/0811; H04L 45/02; H04L 45/38;
H04L 45/42; H04L 45/56; H04L 45/563;
H04L 45/586; H04L 45/60; H04L 45/64;
H04L 45/745; H04L 47/2441; H04L
47/2483; H04L 47/70; H04L 49/00; H04L
49/25; H04L 49/70; H04L 67/10; H04L
67/327; H04L 67/34; H04L 9/0643; H04L
9/3242; H04L 41/0813; H04L 41/0846;
H04L 41/0859; H04L 45/021; H04L
45/54; H04L 45/7453; H04L 47/2411;
H04L 67/2852; H04L 63/1416

See application file for complete search history.

(56) References Cited

U.S. PATENT DOCUMENTS

| | | | | |
|---|---|---|---|---|
| 6,034,957 A * | 3/2000 | Haddock | ............... | H04L 45/745 370/392 |
| 6,363,396 B1 * | 3/2002 | Klots | ............... | G06F 9/52 |
| 6,615,336 B1 * | 9/2003 | Chen | ............... | H04L 12/413 370/351 |
| 6,665,297 B1 * | 12/2003 | Hariguchi | ............... | H04L 45/00 370/392 |
| 6,690,667 B1 * | 2/2004 | Warren | ............... | H04L 45/54 370/389 |
| 6,862,287 B2 * | 3/2005 | Brown | ............... | H04L 45/745 370/392 |
| 6,915,296 B2 * | 7/2005 | Parson | ............... | G06F 17/30949 |
| 6,947,963 B1 * | 9/2005 | Agarwal | ............... | H04L 45/00 709/201 |
| 7,133,403 B1 * | 11/2006 | Mo | ............... | H04L 41/12 370/390 |
| 7,284,272 B2 * | 10/2007 | Howard | ............... | H04L 63/1408 726/11 |
| 7,286,528 B1 * | 10/2007 | Pannell | ............... | H04L 12/4625 370/389 |
| 7,342,931 B2 * | 3/2008 | Lee | ............... | H04L 45/745 370/395.32 |
| 7,376,078 B1 * | 5/2008 | Amiocangioli | ............... | H04L 45/00 370/217 |
| 7,386,753 B2 * | 6/2008 | Newport | ............... | G06F 9/5061 709/221 |
| 7,397,766 B2 * | 7/2008 | Kodialam | ............... | H04L 41/14 370/252 |
| 7,508,772 B1 * | 3/2009 | Ward | ............... | H04L 45/02 370/254 |
| 7,512,123 B1 * | 3/2009 | DeSanti | ............... | H04L 29/12801 370/389 |
| 7,756,805 B2 * | 7/2010 | Cormode | ............... | G06F 17/30516 706/46 |
| 7,774,639 B2 * | 8/2010 | Newport | ............... | G06F 9/5061 709/221 |
| 7,826,369 B2 * | 11/2010 | Filsfils | ............... | H04L 45/00 370/235 |
| 7,870,419 B2 * | 1/2011 | Newport | ............... | G06F 9/5061 709/203 |
| 7,885,294 B2 * | 2/2011 | Patel | ............... | H04L 69/04 370/202 |
| 7,886,175 B1 * | 2/2011 | Venable, Sr. | ............... | G06F 9/542 713/400 |
| 7,940,649 B2 * | 5/2011 | Kapoor | ............... | H04L 45/02 370/218 |
| 7,990,958 B2 * | 8/2011 | Brown | ............... | H04L 45/745 370/389 |
| 8,145,642 B2 * | 3/2012 | Cruanes | ............... | G06F 17/30498 707/745 |
| 8,149,713 B2 * | 4/2012 | Sun | ............... | H04L 45/00 370/237 |
| 8,204,985 B2 * | 6/2012 | Cao | ............... | H04L 41/142 709/224 |
| 8,218,561 B2 * | 7/2012 | Akhter | ............... | H04L 43/0817 370/419 |
| 8,270,318 B1 * | 9/2012 | Kumbhari | ............... | H04L 12/4625 370/254 |
| 8,271,500 B2 * | 9/2012 | Chellapilla | ............... | H04L 9/3236 707/747 |
| 8,290,919 B1 * | 10/2012 | Kelly | ............... | G06F 17/302 707/698 |
| 8,320,277 B2 * | 11/2012 | Schutz | ............... | H04L 45/00 370/254 |
| 8,397,025 B2 * | 3/2013 | Punde | ............... | G06F 12/0895 707/693 |
| 8,402,301 B2 * | 3/2013 | Venable, Sr. | ............... | G06F 9/542 713/400 |
| 8,467,403 B2 * | 6/2013 | Tsier | ............... | H04L 45/00 370/419 |
| 8,526,437 B2 * | 9/2013 | Yumoto | ............... | H04L 45/00 370/242 |
| 8,565,597 B2 * | 10/2013 | Zheng | ............... | H04L 12/6418 398/51 |
| 8,572,225 B2 * | 10/2013 | Scudder | ............... | H04L 45/22 709/223 |
| 8,588,229 B1 * | 11/2013 | Pannell | ............... | H04L 12/4625 370/389 |
| 8,638,791 B2 * | 1/2014 | Pacella | ............... | H04L 45/00 370/392 |
| 8,681,603 B1 * | 3/2014 | Bishara | ............... | H04L 45/00 370/216 |
| 8,726,034 B2 * | 5/2014 | Papamanthou | ............... | G06F 21/64 713/189 |
| 8,750,099 B2 * | 6/2014 | Patel | ............... | H04L 45/04 370/225 |
| 8,769,224 B1 * | 7/2014 | Raj | ............... | G06F 11/1453 711/154 |
| 8,792,494 B2 * | 7/2014 | Angst | ............... | H04L 45/7453 370/392 |
| 8,812,555 B2 * | 8/2014 | Larson | ............... | G06F 17/30949 707/747 |
| 8,817,796 B2 * | 8/2014 | Basso | ............... | H04L 45/742 370/395.31 |
| 8,854,973 B2 * | 10/2014 | Basso | ............... | H04L 45/7453 370/235.1 |
| 8,867,550 B2 * | 10/2014 | Bawsso | ............... | H04L 45/7453 370/395.31 |
| 8,868,926 B2 * | 10/2014 | Hunt | ............... | G06F 17/3033 713/189 |
| 8,873,409 B2 * | 10/2014 | Filsfils | ............... | H04L 45/025 370/252 |
| 8,879,562 B2 * | 11/2014 | Basso | ............... | H04L 45/742 370/395.31 |
| 8,913,525 B2 * | 12/2014 | Welin | ............... | H04L 29/12028 370/258 |
| 8,931,088 B2 * | 1/2015 | Chen | ............... | H04L 43/00 726/22 |
| 8,934,490 B2 * | 1/2015 | Chunduri | ............... | H04L 45/02 370/351 |
| 8,938,469 B1 * | 1/2015 | Keen | ............... | H04L 45/7453 707/747 |
| 8,958,294 B2 * | 2/2015 | Gabriel | ............... | H04L 41/5022 370/230 |
| 8,959,095 B2 * | 2/2015 | Pope | ............... | H04L 45/742 707/754 |
| 8,989,193 B2 * | 3/2015 | Angst | ............... | H04L 45/7453 370/392 |
| 8,997,223 B2 * | 3/2015 | Roberson | ............... | H04L 63/1416 709/224 |
| 9,014,174 B2 * | 4/2015 | Williams | ............... | H04L 45/54 370/351 |

(56) References Cited

U.S. PATENT DOCUMENTS

| | | | |
|---|---|---|---|
| 9,036,477 B2* | 5/2015 | Xu | H04L 47/17 370/235 |
| 9,049,149 B2* | 6/2015 | Colven | H04L 49/552 |
| 9,077,702 B2* | 7/2015 | Roberson | H04L 63/08 |
| 9,083,710 B1* | 7/2015 | Yadav | H04L 67/1004 |
| 9,098,725 B2* | 8/2015 | Papamanthou | G06F 21/64 |
| 9,124,527 B2* | 9/2015 | Basso | H04L 45/7453 |
| 9,135,123 B1* | 9/2015 | Armangau | G06F 11/1471 |
| 9,143,441 B2* | 9/2015 | Basso | H04L 45/7453 |
| 9,178,806 B2* | 11/2015 | Varvello | H04L 45/306 |
| 9,191,139 B1* | 11/2015 | Venkata | H04J 11/00 |
| 9,197,560 B2* | 11/2015 | Gabriel | H04L 41/5022 |
| 9,203,752 B2* | 12/2015 | Chen | H04L 12/4641 |
| 9,210,083 B2* | 12/2015 | Basso | H04L 45/7453 |
| 9,215,171 B2* | 12/2015 | Basso | H04L 45/7453 |
| 9,215,172 B2* | 12/2015 | Basso | H04L 45/7453 |
| 9,225,597 B2* | 12/2015 | Tubaltsev | H04L 45/02 |
| 9,237,066 B2* | 1/2016 | Janardhanan | H04L 41/0668 |
| 9,240,975 B2* | 1/2016 | Roberson | H04L 63/02 |
| 9,264,302 B2* | 2/2016 | Ernstrom | H04L 41/0668 |
| 9,270,636 B2* | 2/2016 | Narasimhamurthy | H04L 61/255 |
| 9,350,684 B2* | 5/2016 | Willis | H04L 45/02 |
| 9,384,227 B1* | 7/2016 | Xiao | G06F 17/30584 |
| 9,397,946 B1* | 7/2016 | Yadav | H04L 41/0806 |
| 9,405,643 B2* | 8/2016 | Cowling | G06F 17/3033 |
| 9,467,422 B2* | 10/2016 | Roberson | H04L 63/1416 |
| 9,485,115 B2* | 11/2016 | Kapadia | H04L 45/02 |
| 9,491,087 B1* | 11/2016 | Zhang | H04L 45/02 |
| 9,537,771 B2* | 1/2017 | Arad | H04L 45/7453 |
| 9,559,936 B2* | 1/2017 | Semwal | H04L 45/02 |
| 9,699,066 B2* | 7/2017 | Kapadia | H04L 45/08 |
| 9,729,427 B2* | 8/2017 | Fenner | H04L 45/021 |
| 9,740,759 B1* | 8/2017 | Zhang | G06F 17/30575 |
| 9,762,538 B2* | 9/2017 | Roberson | H04L 63/08 |
| 9,787,575 B2* | 10/2017 | Gattani | H04L 45/24 |
| 2001/0011303 A1* | 8/2001 | Chang | H04L 12/5835 709/227 |
| 2002/0129086 A1* | 9/2002 | Garcia-Luna-Aceves | H04L 45/00 709/200 |
| 2002/0196782 A1* | 12/2002 | Furukawa | H04Q 3/0025 370/352 |
| 2003/0026259 A1* | 2/2003 | Brown | H04L 45/00 370/392 |
| 2003/0086422 A1* | 5/2003 | Klinker | H04L 29/06 370/389 |
| 2003/0208572 A1* | 11/2003 | Shah | H04L 41/12 709/223 |
| 2003/0218978 A1* | 11/2003 | Brown | G06F 17/30949 370/230 |
| 2003/0226034 A1* | 12/2003 | Howard | H04L 63/1408 726/22 |
| 2004/0083347 A1* | 4/2004 | Parson | G06F 17/30949 711/165 |
| 2004/0085953 A1* | 5/2004 | Davis | H04L 45/00 370/356 |
| 2004/0105447 A1* | 6/2004 | Lee | H04L 45/745 370/395.32 |
| 2004/0153573 A1* | 8/2004 | Kim | H04L 45/04 709/242 |
| 2004/0193619 A1* | 9/2004 | Venkatachary | H04L 45/00 |
| 2005/0074003 A1* | 4/2005 | Ball | H04L 45/04 370/389 |
| 2005/0111351 A1* | 5/2005 | Shen | H04L 45/02 370/217 |
| 2005/0141501 A1* | 6/2005 | Kadambi | H04L 69/161 370/389 |
| 2005/0171927 A1* | 8/2005 | Chan | G06F 9/50 |
| 2005/0220023 A1* | 10/2005 | Kodialam | H04L 41/14 370/235 |
| 2006/0048020 A1* | 3/2006 | Newport | G06F 9/5061 714/49 |
| 2006/0117036 A1* | 6/2006 | Cruanes | G06F 17/30498 |
| 2007/0136331 A1* | 6/2007 | Hasan | G06F 17/30949 |
| 2007/0288526 A1* | 12/2007 | Mankad | G06F 11/1662 |
| 2007/0294319 A1* | 12/2007 | Mankad | G06F 11/1662 |
| 2008/0031239 A1* | 2/2008 | Kapoor | H04L 45/02 370/389 |
| 2008/0112413 A1* | 5/2008 | Pong | H04L 45/00 370/392 |
| 2008/0147843 A1* | 6/2008 | Scudder | H04L 45/02 709/223 |
| 2008/0195689 A1* | 8/2008 | Newport | G06F 9/5061 709/201 |
| 2008/0195690 A1* | 8/2008 | Newport | G06F 9/5061 709/201 |
| 2009/0070354 A1* | 3/2009 | Chellapilla | H04L 9/3236 |
| 2009/0265501 A1* | 10/2009 | Uehara | G06F 11/2033 710/312 |
| 2010/0215047 A1* | 8/2010 | Filsfils | H04L 45/00 370/401 |
| 2010/0246587 A1* | 9/2010 | Schutz | H04L 45/00 370/401 |
| 2010/0271964 A1* | 10/2010 | Akhter | H04L 43/0817 370/252 |
| 2011/0075680 A1* | 3/2011 | Sun | H04L 45/00 370/419 |
| 2011/0099409 A1* | 4/2011 | Venable, Sr. | G06F 9/542 713/401 |
| 2011/0122874 A1* | 5/2011 | Pacella | H04L 45/00 370/392 |
| 2011/0122889 A1* | 5/2011 | Pacella | H04L 45/742 370/428 |
| 2011/0134931 A1* | 6/2011 | Merwe | H04L 41/0816 370/401 |
| 2011/0188857 A1* | 8/2011 | Zheng | H04L 12/6418 398/45 |
| 2011/0225429 A1* | 9/2011 | Papamanthou | G06F 21/64 713/189 |
| 2011/0239299 A1* | 9/2011 | Chen | H04L 63/1408 726/23 |
| 2011/0246489 A1* | 10/2011 | Pope | H04L 45/742 707/754 |
| 2011/0249676 A1* | 10/2011 | Singh | H04L 49/15 370/395.32 |
| 2011/0255539 A1* | 10/2011 | Yumoto | H04L 45/00 370/392 |
| 2012/0163165 A1* | 6/2012 | Ra | H04L 45/50 370/225 |
| 2012/0173844 A1* | 7/2012 | Punde | G06F 12/0895 711/216 |
| 2012/0221708 A1* | 8/2012 | Bhardwaj | H04L 67/10 709/224 |
| 2012/0300676 A1* | 11/2012 | Welin | H04L 29/12028 370/258 |
| 2012/0323970 A1* | 12/2012 | Larson | G06F 17/30949 707/800 |
| 2013/0010600 A1 | 1/2013 | Jocha et al. | |
| 2013/0024649 A1* | 1/2013 | Guo | H04L 45/54 711/207 |
| 2013/0151535 A1* | 6/2013 | Dusberger | G06F 17/30336 707/747 |
| 2013/0155845 A1* | 6/2013 | Patel | H04L 45/04 370/225 |
| 2013/0163427 A1 | 6/2013 | Beliveau et al. | |
| 2013/0182713 A1* | 7/2013 | Giacomoni | H04L 69/321 370/400 |
| 2013/0185430 A1* | 7/2013 | Giacomoni | H04L 69/162 709/225 |
| 2013/0198332 A1* | 8/2013 | Van Ackere | H04L 29/12018 709/217 |
| 2013/0226813 A1* | 8/2013 | Voltz | G06Q 20/38215 705/67 |
| 2013/0258838 A1* | 10/2013 | Colven | H04L 49/552 370/218 |
| 2013/0259035 A1* | 10/2013 | Chen | H04L 12/4641 370/389 |

(56) References Cited

U.S. PATENT DOCUMENTS

| | | | |
|---|---|---|---|
| 2013/0268770 A1* | 10/2013 | Hunt | G06F 17/3033 713/189 |
| 2014/0016641 A1* | 1/2014 | Yumoto | H04L 45/00 370/392 |
| 2014/0036918 A1* | 2/2014 | Varvello | H04L 45/306 370/392 |
| 2014/0043964 A1* | 2/2014 | Gabriel | H04L 41/5022 370/229 |
| 2014/0064087 A1* | 3/2014 | Gabriel | H04L 41/5022 370/235 |
| 2014/0064090 A1* | 3/2014 | Basso | H04L 45/7453 370/235.1 |
| 2014/0064091 A1* | 3/2014 | Basso | H04L 45/742 370/235.1 |
| 2014/0064092 A1* | 3/2014 | Basso | H04L 45/742 370/235.1 |
| 2014/0064093 A1* | 3/2014 | Basso | H04L 45/7453 370/235.1 |
| 2014/0064276 A1* | 3/2014 | Basso | H04L 45/7453 370/392 |
| 2014/0064277 A1* | 3/2014 | Basso | H04L 45/44 370/392 |
| 2014/0064281 A1* | 3/2014 | Basso | H04L 45/44 370/392 |
| 2014/0064282 A1* | 3/2014 | Basso | H04L 45/7453 370/392 |
| 2014/0079061 A1* | 3/2014 | Angst | H04L 45/7453 370/392 |
| 2014/0079064 A1* | 3/2014 | Angst | H04L 45/7453 370/392 |
| 2014/0095458 A1* | 4/2014 | Kim | G06F 17/3033 707/698 |
| 2014/0108789 A1* | 4/2014 | Phatak | G06F 21/34 713/156 |
| 2014/0122791 A1* | 5/2014 | Fingerhut | H04L 49/00 711/108 |
| 2014/0133353 A1* | 5/2014 | Jung | H04L 45/08 370/254 |
| 2014/0211800 A1* | 7/2014 | Chunduri | H04L 45/02 370/392 |
| 2014/0211806 A1* | 7/2014 | Basso | H04L 45/742 370/392 |
| 2014/0215560 A1* | 7/2014 | Roberson | H04L 63/02 726/3 |
| 2014/0215561 A1* | 7/2014 | Roberson | H04L 63/08 726/3 |
| 2014/0215562 A1* | 7/2014 | Roberson | H04L 63/1416 726/3 |
| 2014/0245006 A1* | 8/2014 | Papamanthou | G06F 21/64 713/168 |
| 2014/0301394 A1* | 10/2014 | Arad | H04L 45/7453 370/392 |
| 2014/0317256 A1* | 10/2014 | Jiang | H04L 45/02 709/223 |
| 2014/0337375 A1* | 11/2014 | Yue | G06F 17/30424 707/769 |
| 2014/0369186 A1* | 12/2014 | Ernstrom | H04L 41/0668 370/228 |
| 2015/0016456 A1* | 1/2015 | Ramanathan | H04L 45/306 370/392 |
| 2015/0019501 A1* | 1/2015 | Akirav | G06F 17/30159 707/692 |
| 2015/0019502 A1* | 1/2015 | Aronovich | G06F 17/30156 707/692 |
| 2015/0019815 A1* | 1/2015 | Aronovich | G06F 3/0641 711/129 |
| 2015/0019816 A1* | 1/2015 | Akirav | G06F 3/0641 711/129 |
| 2015/0019817 A1* | 1/2015 | Akirav | G06F 12/0848 711/129 |
| 2015/0039784 A1* | 2/2015 | Westphal | H04L 45/306 709/240 |
| 2015/0113166 A1* | 4/2015 | Mosko | H04L 45/14 709/242 |
| 2015/0149500 A1* | 5/2015 | Cowling | G06F 17/3033 707/769 |
| 2015/0229610 A1* | 8/2015 | Roberson | H04L 63/1416 726/13 |
| 2015/0263899 A1* | 9/2015 | Tubaltsev | H04L 45/02 370/254 |
| 2015/0288655 A1* | 10/2015 | Narasimhamurthy | H04L 61/255 370/475 |
| 2015/0312134 A1* | 10/2015 | Kapadia | H04L 45/02 370/256 |
| 2015/0324690 A1* | 11/2015 | Chilimbi | G06N 3/063 706/25 |
| 2015/0341314 A1* | 11/2015 | Roberson | H04L 63/08 726/1 |
| 2015/0350077 A1* | 12/2015 | Durrani | H04L 45/745 709/225 |
| 2015/0358288 A1* | 12/2015 | Jain | H04L 63/0254 726/13 |
| 2016/0087876 A1* | 3/2016 | Fan | H04L 63/0272 709/242 |
| 2016/0087880 A1* | 3/2016 | Shalita | H04L 67/2842 709/215 |
| 2016/0164836 A1* | 6/2016 | Roberson | H04L 63/02 726/1 |
| 2016/0241457 A1* | 8/2016 | Semwal | H04L 45/02 |
| 2016/0241474 A1* | 8/2016 | Wang | H04L 45/7453 |
| 2016/0277282 A1* | 9/2016 | Chen | H04L 45/122 |
| 2016/0308767 A1* | 10/2016 | Borgione | H04L 45/745 |
| 2016/0321294 A1* | 11/2016 | Wang | G06F 17/30194 |
| 2016/0330102 A1* | 11/2016 | Fenner | H04L 45/021 |
| 2016/0352619 A1* | 12/2016 | Gattani | H04L 45/24 |
| 2017/0012874 A1* | 1/2017 | Lee | H04L 45/021 |
| 2017/0041212 A1* | 2/2017 | Kapadia | H04L 45/02 |
| 2017/0046342 A1* | 2/2017 | Azgin | H04L 45/748 |
| 2017/0090760 A1* | 3/2017 | Kalipatnapu | G06F 3/0604 |
| 2017/0090814 A1* | 3/2017 | Yeung | G06F 3/0638 |
| 2017/0104666 A1* | 4/2017 | Semwal | H04L 45/02 |
| 2017/0139913 A1* | 5/2017 | Hsiao | G06F 17/3033 |
| 2017/0220290 A1* | 8/2017 | Boddu | G06F 3/0632 |
| 2017/0230290 A1* | 8/2017 | Li | H04L 45/7457 |
| 2017/0264552 A1* | 9/2017 | Duda | H04L 47/17 |
| 2017/0272192 A1* | 9/2017 | Qu | H04J 3/0697 |
| 2017/0279709 A1* | 9/2017 | Bonica | H04L 43/16 |
| 2017/0324662 A1* | 11/2017 | Holmberg | H04L 45/748 |

OTHER PUBLICATIONS

"OpenFlow Switch Specification", Dec. 5, 2011 (Dec. 5, 2011), XP055177510, Retrieved from the Internet: URL: http://www.opennetworking.org/images/stories/downloads/sdn-resources/onf-specifications/openflow/openflow-spec-v1.2.pdf [retrieved on Jul. 27, 2015] p. 62.

Singla et al., "OpenContrail Architecture Documentation", Feb. 8, 2014 (Feb. 8, 2014), XP055204674, Retrieved from the Internet: URL:http://web.archive.org/web/20140208021157/http://opencontrail.org/opencontrail-architecture-documentation/ [retrieved on Jul. 27, 2015] p. 2-p. 12.

Pfaff et al., OpenFlow Switch Specification, Dec. 31, 2009, 42 pages.

McKeown et al., OpenFlow: Enabling Innovation in Campus Networks, Mar. 14, 2008, 6 pages.

Cisco Systems, Cisco Catalyst 6500 Architecture, 1992-2007, 28 pages.

Wundsam et al., NOSIX: A Portable Switch Interface for the Network Operating System, Oct. 2012, 7 pages, retrieved from <URL:http://www1.icsi.berkeley.edu/~andi/nosix_tr-icsi-2012.pdf>.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * |  | SEND TO PORT 3 |
| * | * | * | * | 172.12.3.4 | * | * | ⋮ | SEND TO PORT 4 |
| * | * | * | * | * | * | 80 |  | DROP |

FIG. 4

| SW₁ | |
|---|---|
| ETHERNET ADDRESS | PORT |
| MACEH₁ | P₁ |
| MACEH₂ | P₂ |
| MACEH₃ | P₃ |
| MACEH₄ | P₂ |

122 ↗

| SW₂ | |
|---|---|
| ETHERNET ADDRESS | PORT |
| MACEH₁ | P₃ |
| MACEH₂ | P₁ |
| MACEH₃ | P₃ |
| MACEH₄ | P₂ |

HOST TABLE

| ADDRESS | SWITCH | PORT |
|---|---|---|
| MACEH₁ | SW₁ | P₁ |
| MACEH₂ | SW₂ | P₁ |
| MACEH₃ | SW₁ | P₃ |
| MACEH₄ | SW₂ | P₂ |

132 ↗   134

INTER-SWITCH FORWARDING TABLE

| SOURCE | DESTINATION | PORT |
|---|---|---|
| SW₁ | SW₂ | P₂ |
| SW₂ | SW₁ | P₃ |

$F_{L2TABLE}$ (SWITCH, ADDRESS)

if    HOSTTABLE AT ADDRESS MATCHES
           INPUT SWITCH RETURN PORT
           FROM HOSTTABLE else RETURN PORT FROM INTER-SWITCH
           FORWARDING TABLE ENTRY THAT MATCHES
           THE INPUT SWITCH AND THE SWITCH AT
           HOSTTABLE[ADDRESS]

FIG. 11

NETWORK SNAPSHOT

NETWORK SNAPSHOT

SYSTEMS AND METHODS FOR CONTROLLING NETWORK SWITCHES USING A SWITCH MODELING INTERFACE AT A CONTROLLER

BACKGROUND

This relates to communication networks, and more particularly, to communication networks having network switches that are controlled by a controller.

Packet-based networks such as the Internet and local data networks that are connected to the internet include network switches. Network switches are used in forwarding packets from packet sources to packet destinations. The packets may be sometimes referred to as frames. For example, data is forwarded over layer 2 of the Open Systems Interconnection (OSI) model as frames (e.g., Ethernet frames), whereas data is forwarded over layer 3 of the OSI model as packets (e.g., Internet Protocol packets).

It can be difficult or impossible to configure the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

It can be challenging for a controller to ensure that switches are successfully configured as the controller intended. Consider the scenario in which a controller provides thousands of control packets to a switch, but the switch processing capacity is insufficient to process the control packets at the rate they are provided by the controller. As another example, configuration storage capacity at a switch may be filled and the switch may be incapable of storing any additional configuration data without overwriting existing configuration data. As yet another example, a new switch may connect or an existing switch may disconnect from the network, which may lead to mismatch between the controller's view of the network and the actual configuration state of the network.

SUMMARY

A controller may control switches in a network having end hosts that are coupled to the switches. The controller may include a switch modeling interface that maintains switch models of the switches in the network and uses the switch models in generating control messages for the switches to implement desired network configurations. The switch modeling interface may receive a desired network configuration from application modules that respond to network events such as connection or disconnection of a switch or new network policies. The desired network configuration may include a set of tables and a function. The switch modeling interface may operate the function on the set of tables to produce the desired network configuration. For example, the set of tables may include a host table identifying end host attachment points and an inter-switch forwarding table. In this scenario, the switch modeling interface may operate the function on the host table and the inter-switch forwarding table to produce switch-specific forwarding tables for each of the switches.

The switch modeling interface may compare the desired network configuration (e.g., the switch-specific forwarding tables) with the current network configuration represented by the switch models. The switch modeling interface may generate control messages to the switches for only identified differences between the desired network configuration and the current network configuration as identified by the switch models. The switch modeling interface may determine whether the control messages were successfully received and processed by a switch by sending a synchronization request message (e.g., a barrier request message) along with the control messages and waiting for a synchronization reply message (e.g., barrier reply message), an error message, or failure of the switch to respond (e.g., expiration of a timer). The switch modeling interface may indicate success or failure to the application module that provided the desired network configuration.

The switch modeling interface may update the switch models by communicating with the switches. To help reduce the traffic load on network control paths, the switches may be configured to maintain digest tables. A digest table maintained by a switch may include a plurality of entries (e.g., buckets) each associated with a respective digest value. Switch configuration data such as forwarding table entries received at the switch (e.g., via control messages from the controller) may be hashed by the switch and assigned to a selected table entry based on the hashed value. The switch may compute the digest value of each table entry as an XOR of the hashed values assigned to that table entry. The digest values maintained by a switch may be retrieved by the controller and compared to digest values computed by the controller for a desired network configuration. The switch modeling interface at the controller may determine what switch configuration data should be updated in implementing a desired network configuration based on the comparison.

Further features of the present invention, its nature and various advantages will be more apparent from the accompanying drawings and the following detailed description.

BRIEF DESCRIPTION OF THE DRAWINGS

FIG. 4 is a diagram of an illustrative flow table of the type that may be used by a packet processing system showing three illustrative types of packet forwarding that may be performed based on the flow table entries of the flow table in accordance with an embodiment of the present invention.

FIG. 9 is a diagram of illustrative switch state information that may be stored in a switch model in accordance with an embodiment of the present invention.

FIG. 10 is a diagram of illustrative global network state information that may be stored in a switch model and used to generate switch-specific state information in accordance with an embodiment of the present invention.

FIG. 11 is a diagram of an illustrative function that may be stored in a switch model and used by a switch modeling interface to generate switch-specific state information in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server may interact with each of the control clients over respective network links. The use of a cross-platform controller and corresponding controller clients allows potentially disparate network switch equipment to be centrally managed.

Figure 1:
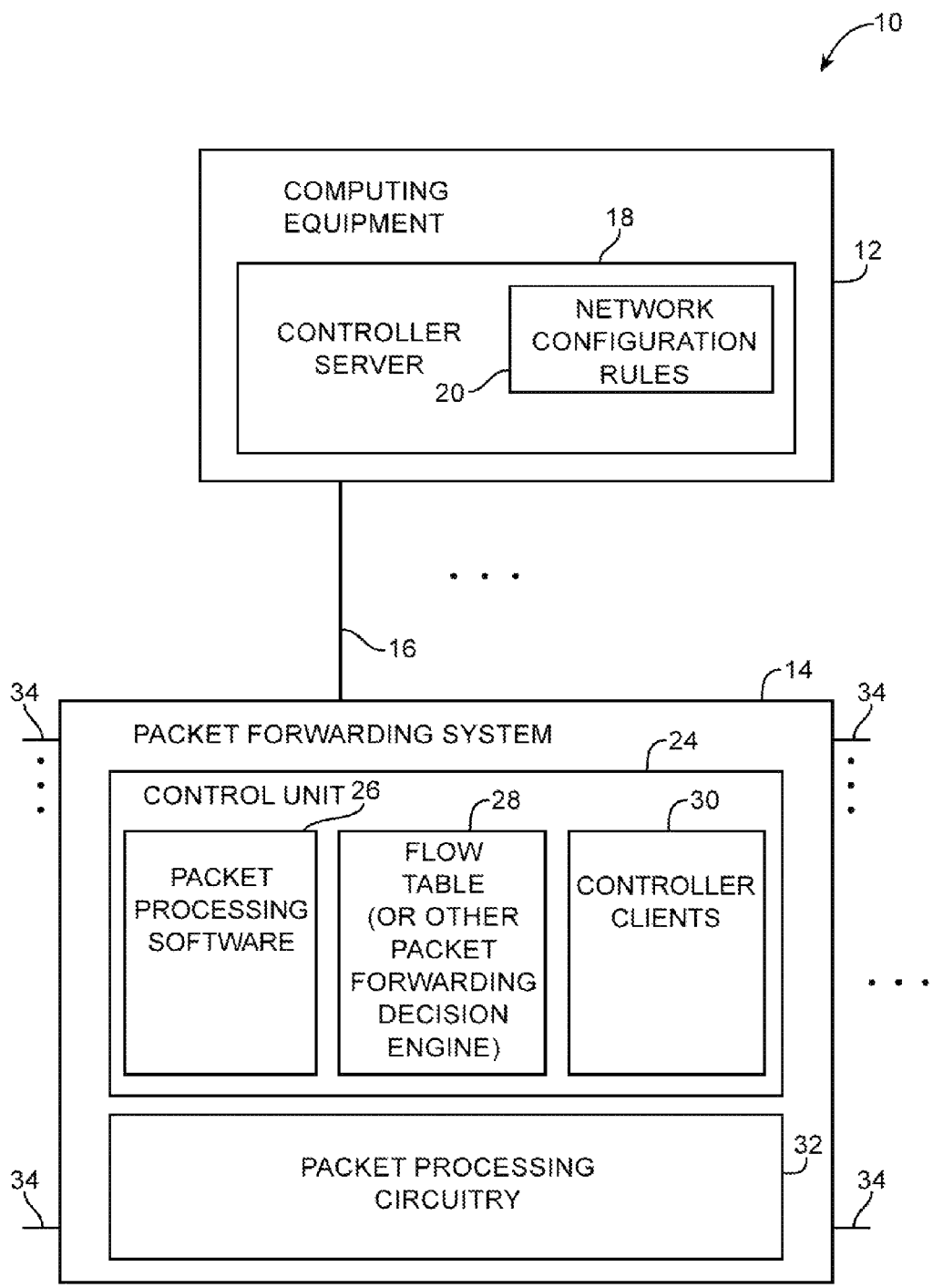
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packet flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. As another example, rules 20 may include service insertion policies identifying network traffic and services that are to be performed on the identified network traffic. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Any desired switch may be provided with controller clients that communicate with and are controlled by a controller server. For example, switch 14 may be implemented using a general purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. The controller server may, if desired, be implemented on one or more line cards in the rack-based system, in another rack-based system, or on other computing equipment that is coupled to the network.

Figure 2:
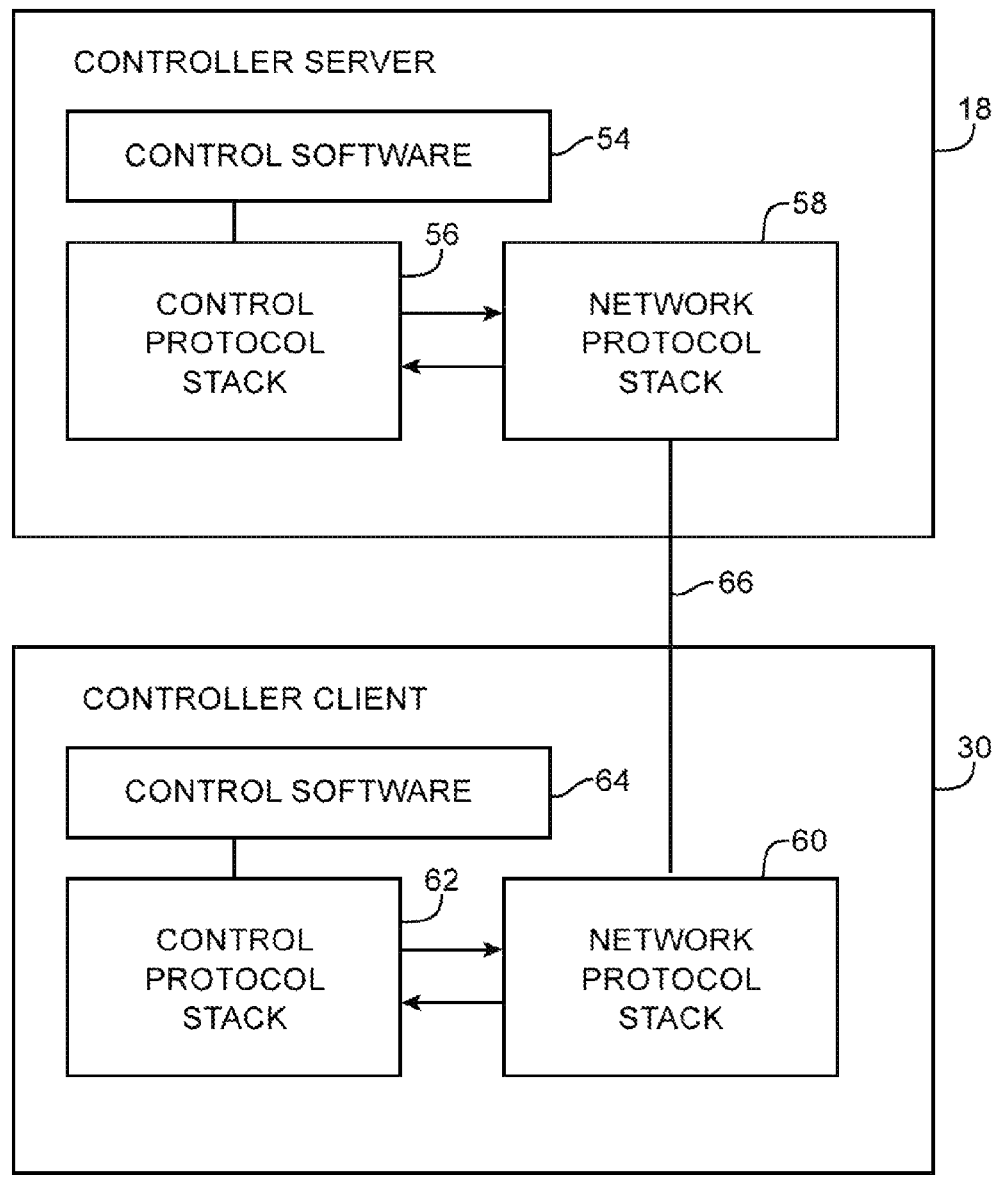
FIG. 2 is a diagram of a controller server and controller client that may communicate over a network connection in accordance with an embodiment of the present invention.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have corresponding actions. When there is a match between the fields in a packet and the fields in a flow table entry, the corresponding action for that flow table entry may be taken.

Figure 3:
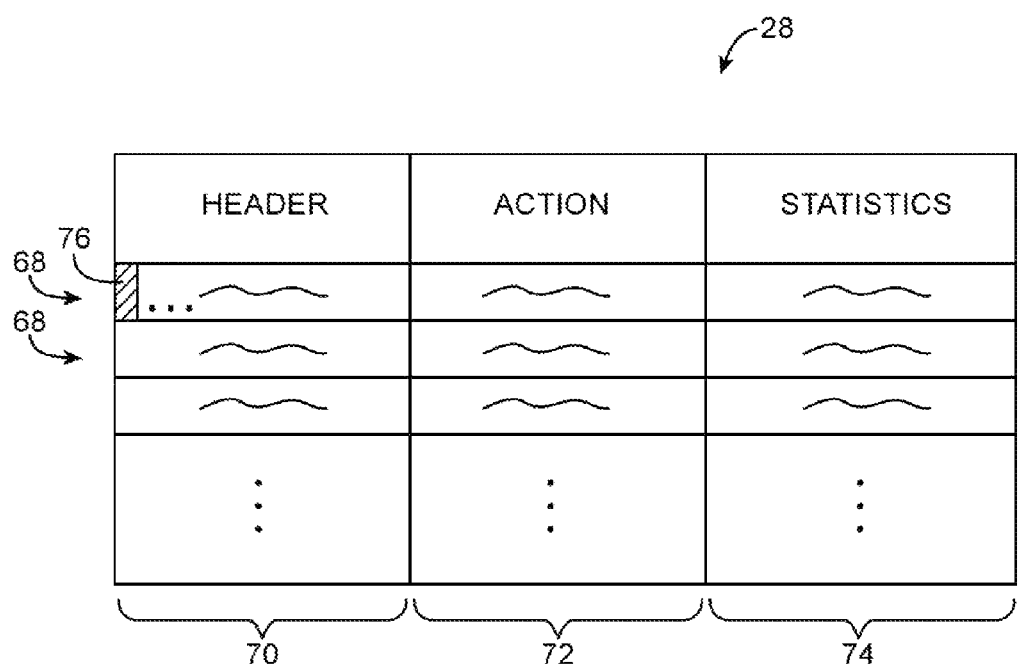
FIG. 3 is a diagram of an illustrative flow table of the type that may be used by a packet processing system in accordance with an embodiment of the present invention.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. The modify-field actions may be used in rewriting portions of network packets that match on the flow table entry.

FIG. 4 is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 4 table directs the switch in which the flow table entry is operating to perform Ethernet switching. In particular, incoming packets with matching Ethernet destination addresses are forwarded to port 3.

The entry of the second row of table of FIG. 4 illustrates how a switch may be configured to perform internet routing (i.e., packets are forwarded based on their destination IP address).

The third row of the table of FIG. 4 contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 5:
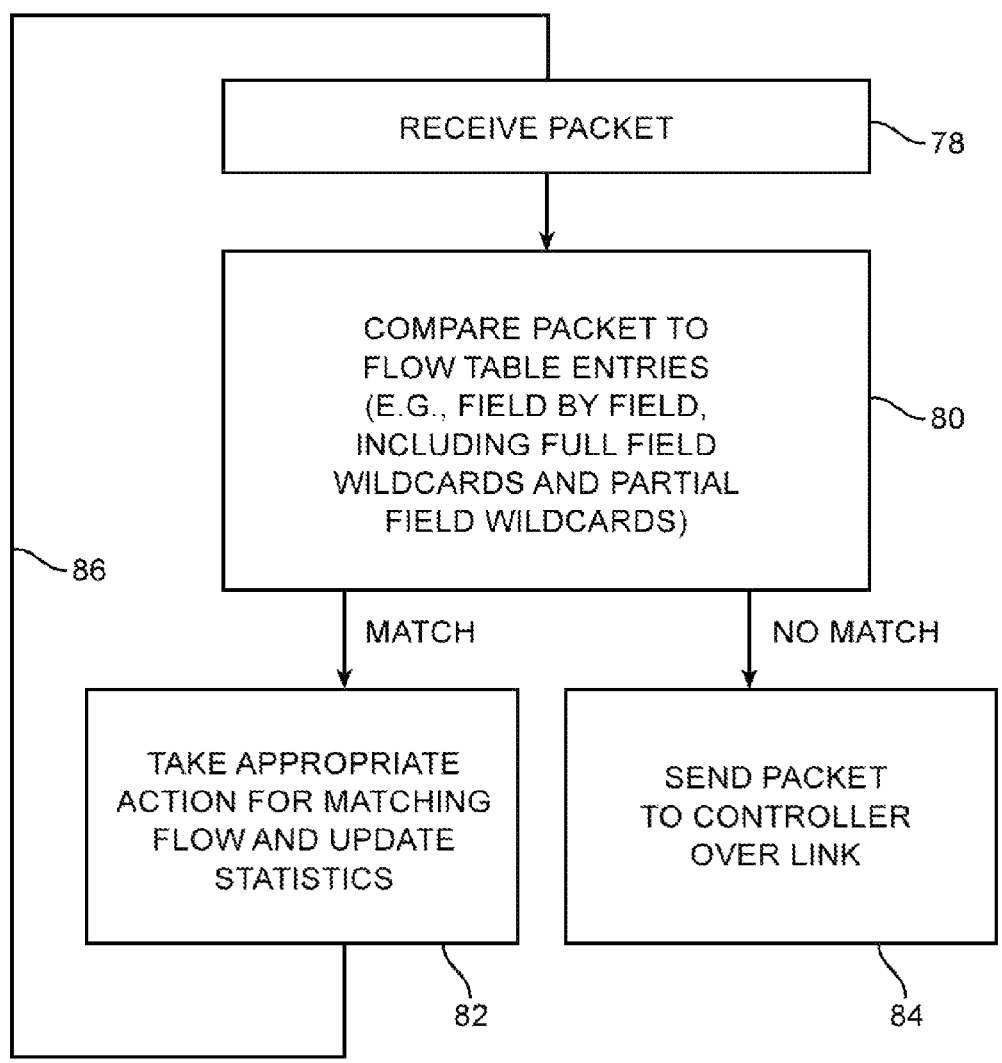
FIG. 5 is a flow chart of illustrative steps involved in processing packets in a packet processing system in accordance with an embodiment of the present invention.

Illustrative steps that may be performed by switch 14 in processing packets that are received on input-output ports 34 are shown in FIG. 5. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., completely wildcarded field).

If it is determined during the operations of step 80 that there is no match between the fields of the packet and corresponding fields of the flow table entries, switch 14 may send the packet to controller server 18 over link 16 (step 24).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 6:
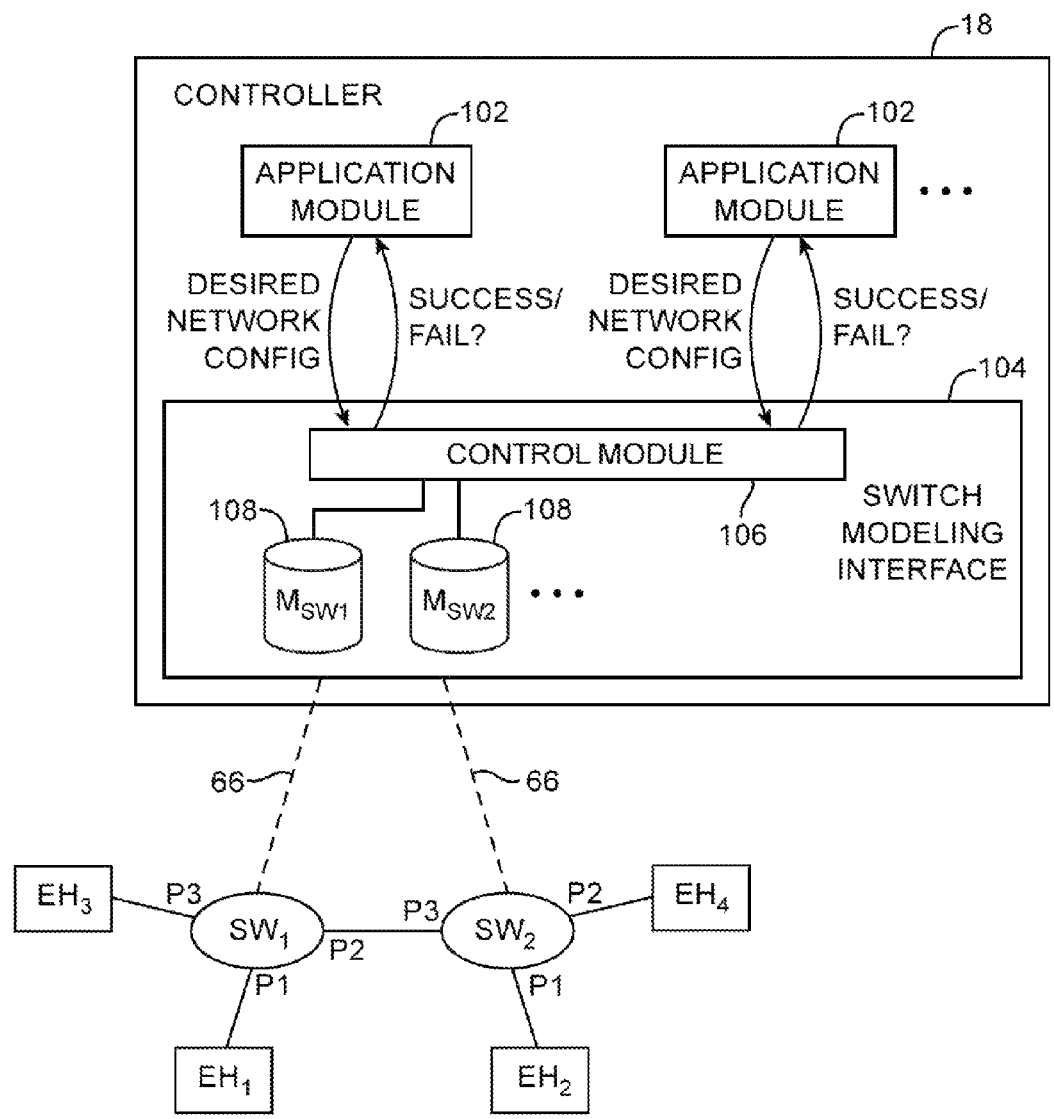
FIG. 6 is a diagram of an illustrative network having switches that may be controlled by a controller having a switch modeling interface in accordance with an embodiment of the present invention.

FIG. 6 is a diagram of an illustrative network 100 in which switches may be controlled by a controller 18. Controller 18 may be a controller server or a distributed controller implemented across multiple computing equipment. As shown in FIG. 6, network 100 may include switches SW1 and SW2. Controller 18 may be coupled to the switches of network 100 via control paths 66. Controller 18 may control the switches using control paths 66 (e.g., by providing flow table entries such as flow table entries 68 of FIG.3). The switches may include switch ports that are coupled to end hosts or to other switches. In the example of FIG. 6, end hosts EH1 and EH3 are coupled to respective ports P1 and P3 of switch SW1, end hosts EH2 and EH4 are coupled to respective ports P1 and P2 of switch SW2, and switches SW1 and SW2 are coupled via port P2 of switch SW1 and port P3 of switch SW2.

Controller 18 may include one or more application modules 102 that control the operations of switches in a network. For example, a first application module 102 may organize switches into virtual switches formed from groups of end hosts or ports on the switches. In this scenario, the first application module may control underlying switches SW1 and SW2 of the network in enforcing network policy and forwarding at the virtual switch level (e.g., the network policies may be defined for virtual switches and not the underlying switches). As another example, a second application module 102 may handle network monitoring functions such as analyzing network traffic to generate network traffic reports. The application modules may generate and provide desired network configurations (e.g., of the entire network) to switch modeling interface 104. Switch modeling interface 104 may use switch models 108 in implementing the desired network configurations and may indicate to the application modules whether the implementation is successful or has failed.

Modules such as modules 102 may be implemented at controller 18 as software on general-purpose or application-specific computing equipment or dedicated hardware. For example, modules 102 may be implemented as software modules on shared computing equipment. As another example, modules 102 may be implemented on different computing equipment in a distributed controller arrangement.

Application modules 102 may control switches based on network topology information maintained at the application modules or maintained by other modules of controller 18. However, there may be hundreds, thousands, or more switches in a network. It can be challenging for application modules 102 to ensure that control messages sent to the switches of a network are successfully received or executed by the switches. In addition, multiple application modules 102 may be implemented at a controller 18 and potentially conflict each other. Consider the scenario in which a switch fails to implement a flow table entry received from controller 18. In this scenario, the state of the switch may not match the expected state and subsequent flow table entries provided by the controller may produce an undesired network configuration.

Controller 18 may be provided with a switch modeling interface module 104 that handles communications with the switches and maintenance of switch states. Switch modeling interface module 104 may help to ensure that application modules 102 are synchronized with the switches of the network. Switch modeling interface 104 may implement models 108 that represent each switch in the network. For example, switch model MSW1 may represent switch SW1, whereas switch model MSW2 may represent switch SW2. Switch models MSW1 and MSW2 may maintain information on the current state of respective switches SW1 and SW2. For example, switch model MSW1 may maintain information identifying the forwarding rules or policies that are implemented at switch SW1, whereas switch model MSW2 may identify the state of switch SW2.

Figure 7:
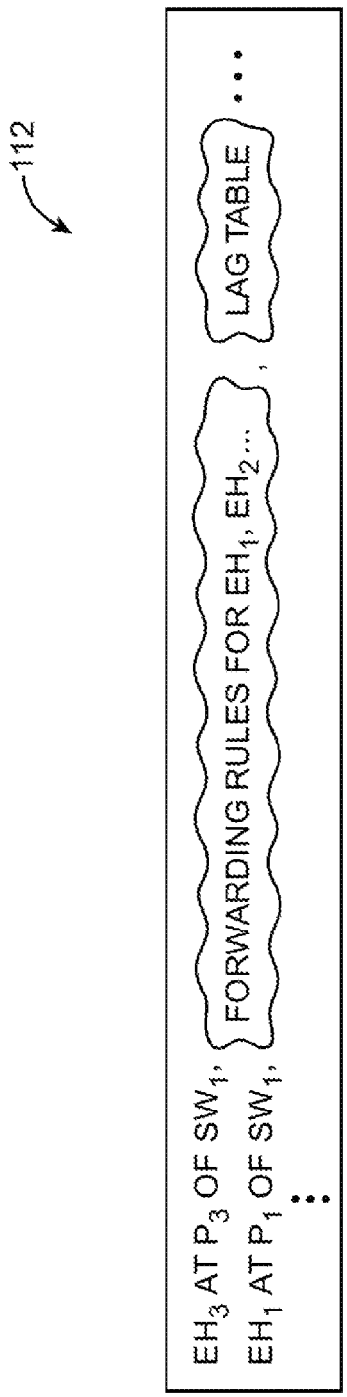
FIG. 7 is a diagram of an illustrative switch model in accordance with an embodiment of the present invention.

Switch models 108 may be controlled by control module 106. Control module 106 may control switch models 108 and issue control messages to switches of the network in fulfilling network control requests from application modules 102. Switch models 108 may be implemented as a data construct as a set of tables. FIG. 7 is a diagram of an illustrative switch model for switch SW1 (e.g., switch model MSW1 of FIG. 6). As shown in FIG. 7, switch model 112 includes information on the state of corresponding switch SW1. The switch state may include end host attachment points, forwarding rules, or other tables storing information on the state of switch MSW1. (e.g., the current switch configuration).

With reference to the exemplary network of FIG. 6, switch model 112 for switch SW1 may include information identifying end hosts and which switch ports are coupled to the end hosts. End host EH1 may be identified as being attached to port P1 of switch SW1, whereas end host EH3 may be identified as connected to port P3 of switch SW1. End hosts that are not directly attached to switch SW1 may be identified by a port through which those end hosts may be reached from switch SW1. For example, end hosts EH2 and EH4 may be identified as being coupled to port P2 of switch SW1, because packets forwarded from port P2 of switch SW1 may reach end hosts EH2 and EH4 through port P2. Switch model 112 may include forwarding rules that govern how network traffic is to be forwarded by switch SW1. As an example, the forwarding rules may be stored as a table that includes entries defining how switch SW1 is to forward network packets for each end host. The forwarding rules may be stored in the switch model as per-switch forwarding rules or may be stored as global, network-wide rules (e.g., tables) that are converted to switch-specific rules via one or more functions that operate on the global rules.

Switch model 112 may include any information on the state of the corresponding switch (e.g., switch SW1). For example, switch model 112 may include a link aggregation group (LAG) table having entries that define link aggregation groups. Each link aggregation group may be assigned a group of ports of the switch that serves as a logical port (e.g., multiple physical ports of the switch may form a link aggregation group through which network traffic is forwarded and received).

Figure 8:
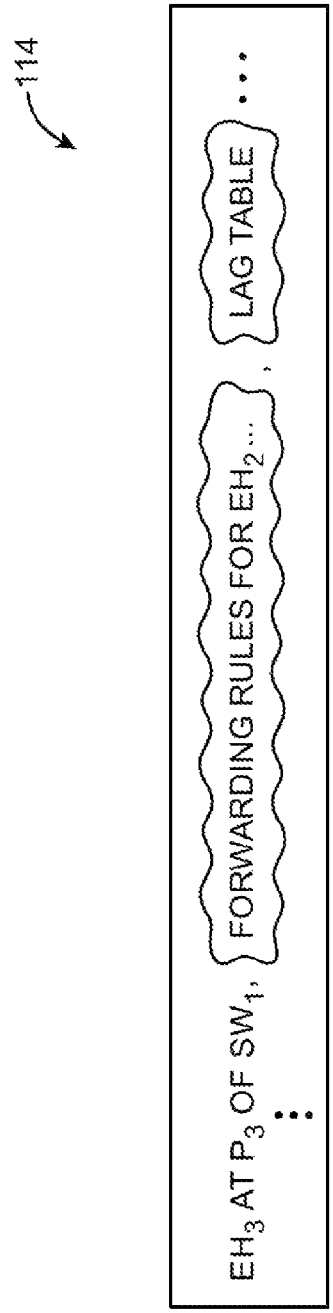
FIG. 8 is a diagram of an illustrative switch model showing how an end host disconnection may be reflected in the switch model in accordance with an embodiment of the present invention.

Switch modeling interface 104 may communicate with switches to monitor the status of the network. For example, control module 106 may send control messages to the switches and/or receive status messages from the switches in monitoring the status of the network. Control module 106 may update switch models in response to updated status information from the switches. FIG. 8 is a diagram illustrating how switch model 112 of FIG. 7 may be updated in response to a status update identifying that end host EH1 has been disconnected from switch SW1. For example, switch SW1 may send a port down message to control module 104 over control paths 66. In this scenario, the port down message may identify that port P1 of switch SW1 is disconnected and may be sent immediately in response to electrical sensor data at switch SW1 or in response to a control message sent from controller 18 to switch SW1.

As shown in FIG. 8, modified switch model 114 does not include any status information for end host EH1. In other words, control module 104 may remove end host EH1 from any attachment point information, forwarding rules, or other tables.

Illustrative forwarding tables including entries that may be provided to switches are shown in FIG. 9. In the example of FIG. 9, forwarding tables 122 and 124 are OSI layer-2 (L2) forwarding tables that operate on Ethernet Media Access Control addresses. Forwarding tables 122 and 124 may serve as flow tables or as subsets (e.g., portions) of flow tables for switches SW1 and SW2. For example, control module 106 may provide flow table entries to switches SW1 and SW2 in populating forwarding tables 122 and 124. Forwarding table 122 may be stored and used by switch SW1 in determining how to forward network packets. Similarly, switch SW2 may store and use forwarding table 124 in forwarding network packets.

Each entry of L2 forwarding table 122 for switch SW1 may identify an end host Ethernet address and a port of switch SW1 to which network traffic destined for the identified Ethernet address should be forwarded. A first L2 forwarding table entry may direct switch SW1 to forward network packets destined for Ethernet address MACEH1 (i.e., end host EH1) to port P1 of switch SW1, because end host EH1 is connected to port P1 of switch SW1. Similarly, an L2 forwarding table entry may identify that network packets destined for end host EH3 should be sent from port P3 (i.e., the port to which end host EH3 is attached). For end hosts such as end hosts EH2 and EH4 that are not directly attached to switch SW1, L2 forwarding table entries may be provided that direct switch SW1 to forward network packets along a network path to the end hosts (e.g., port P2). Similarly, L2 forwarding table 124 for switch SW2 includes entries identifying that network packets destined for Ethernet addresses MACEH1, MACEH2, MACEH3, and MACEH4 should be forward to ports P3, P1, P3, and P2 of switch SW2, respectively.

Copies of forwarding tables 122 and 124 may be stored by a switch modeling interface (e.g., as part of forwarding rules in switch model 112 of FIG. 7). Control module 106 may maintain the local copies to help interface between application modules 102 and switches of the network. For example, control module 106 may use the local copies to simulate the effect of control messages that are provided to the switches. Control module 106 may, as a part of providing control messages to the switches, additional communicate with the switches to verify that the post-control message state at the switches matches the simulated state at switch models 108.

It can be challenging for switch modeling interface 104 to maintain local copies of the state at all switches in a network. Consider the scenario in which a network includes hundreds of switches each having multiple forwarding tables (e.g., L2 forwarding tables, IP forwarding tables etc.). In this scenario, each switch may include hundreds of thousands of table entries that define the current state of that switch (e.g., forwarding table entries, address resolution table entries, link aggregation group table entries, etc.). Due to limited resources such as available memory at the controller, it may be difficult or impossible for the switch modeling interface to store each table entry of each switch.

The switch modeling interface at a controller may be configured to store one or more switch states as a global data construct and a per-switch function that operates on the global data to produce switch-specific state information. FIG. 10 is an illustrative diagram showing how the switch state information in switch-specific forwarding tables of FIG. 9 may be stored as a global data construct including host table 132 and inter-switch forwarding table 136.

Host table 132 includes host table entries 134. that identify attachment points for end hosts. In the example of FIG. 10, Ethernet address MACEH1 of end host EH1 is defined in a first host table entry 134 as being attached to port P1 of switch SW1. Similarly, Ethernet address MACEH2 is identified as being attached to port P1 of switch SW2, Ethernet address MACEH3 is identified as being attached to port P3 of switch SW1, and Ethernet address MACEH4 is identified as being attached to port P2 of switch SW2. Host table 132 is not specific to any particular switch (e.g., host table 132 is a global table).

Inter-switch forwarding table 136 includes inter-switch forwarding table entries 138 that identify links between switches of the network. A first entry 138 may identify that network packets from switch SW1 (e.g., a source switch) that are to be forwarded to switch SW2 (e.g., a destination switch) should be forwarded from port P2 of source switch SW1. A second entry 138 may identify that network packets from source switch SW2 that are to be forwarded to destination switch SW1 should be forwarded from port P3 of switch SW2.

The example of FIG. 10 in which inter-switch forwarding links are identified based on traffic direction is merely illustrative. If desired, each pair of switches may be identified by the ports of the switches that are connected by a network link. For example, an entry 138 may identify a first switch SW1, a second switch SW2, and that port P2 of first switch SW1 is connected to port P3 of second switch SW2. Inter-switch forwarding table 136 may therefore sometimes be referred to herein as an inter-switch link table or an inter-switch connections table, because table 136 identifies connections between switches of the network.

Host table 132 and inter-switch forwarding table 136 represent a global view of the network, thereby helping to remove redundancy of switch state information stored at the controller. For example, switch specific L2 forwarding tables 122 and 124 of FIG. 9 contain redundant information, because each table includes information that identifies where end hosts are connected from the perspective of the corresponding switch (i.e., table 122 identifies where end hosts are connected relative to switch SW1, whereas table 124 identifies where end hosts are connected relative to switch SW2). In a network with many switches (e.g., tens, hundreds, or more), the global tables of FIG. 10 may provide a substantial reduction in the number of entries that are stored by the controller (e.g., because the location of each end host is identified only once).

The switch modeling interface at a controller may be provided with a function that operates on one or more global tables to obtain switch-specific tables for switch models. FIG. 11 is an illustrative diagram of a L2 forwarding table function (FL2TABLE) 142 that receives input data including an input switch and an input address and operates on host table 132 and inter-switch forwarding table 136 of FIG. 10 to produce switch-specific forwarding tables such as tables 122 and 124 of FIG. 9.

To produce a switch-specific forwarding table entry for a particular end host of a switch, the switch modeling interface may provide the Ethernet address of that end host and identify that switch as the input address and input switch for function FL2TABLE. Function FL2TABLE may direct the switch modeling interface to examine the input address and the input switch. If an entry of host table 132 identifies that the input address is attached at the input switch, the corresponding port of that input switch may be retrieved from that entry and returned as the output of FL2TABLE. If the entry for the input address does not identify the input switch, function FL2TABLE may direct the switch modeling interface to return the port from the inter-switch forwarding table entry that matches the input switch and the switch identified by the host table entry.

Consider the scenario in which the switch modeling interface provides switch SW1 and Ethernet address MACEH1 as the inputs to function FL2TABLE. In this scenario, function FL2TABLE directs the switch modeling interface to retrieve the host table entry at input address MACEH1. The retrieved host table entry identifies switch SW1 and port P1 (see FIG. 10), which matches the input switch and therefore port P1 may be returned as the output of function FL2TABLE. A switch-specific L2 forwarding table entry for table 122 may be thereby generated that identifies Ethernet address MACEH1 as being attached to port P1 of switch SW1.

As another example, consider the scenario in which the switch modeling interface generates an L2 forwarding table entry for switch SW1 and end host EH2 by providing switch SW1 and Ethernet address MACEH2 as the inputs to function FL2TABLE. In this scenario, the switching modeling interface may retrieve the host table entry at input address MACEH2 as instructed by function FL2TABLE. The retrieved host table entry identifies that Ethernet address MACEH2 is attached at port P1 of switch SW2, which does not match input switch SW1. In response, function FL2TABLE may instruct the switch modeling interface to retrieve the inter-switch connection table entry that matches input switch SW1 and identified switch SW2. The retrieved entry 138 may identify that port P2 of switch SW1 is connected to switch SW2 (see, e.g., the first entry of table 136 of FIG. 10). Identified port P2 of switch SW1 may be returned as the output of function FL2TABLE. A switch-specific L2 forwarding table entry for table 122 may be thereby generated that identifies Ethernet address MACEH2 as being coupled to port P2 of switch SW1.

The example of FIGS. 10 and 11 in which global tables are used to help reduce the storage footprint of L2 forwarding information is merely illustrative. Controller 18 can be configured with global data constructs for any desired switch-specific information such as address resolution protocol tables, link aggregation group tables, or other information maintained at individual switches of a network. Controller 18 may be configured with any number of functions that operate on inputs and the global data constructs to reconstruct the switch-specific information.

Figure 12:
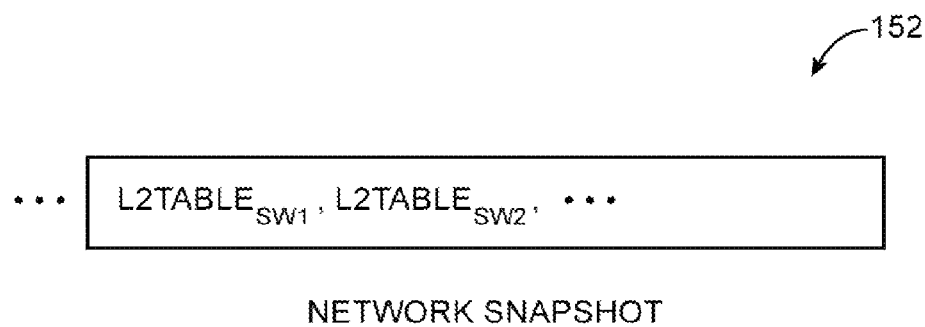
FIG. 12 is a diagram of an illustrative network snapshot of a desired network configuration that may be provided by an application module to a switch modeling interface in accordance with an embodiment of the present invention.

Application modules such as application modules 102 of FIG. 6 may indicate desired modification to a network configuration by providing a network snapshot to the switch modeling interface. The switch modeling interface may communicate with the switches to implement the desired modifications while helping to ensure correctness using switch models. FIG. 12 is an illustrative network snapshot 152 that may be provided by an application module to the switch modeling interface. Network snapshot 152 may include a set of desired switch states. In the example of FIG. 12, snapshot 152 includes layer 2 forwarding tables L2TABLESW1 and L2TABLESW2 for switches SW1 and SW2 of the network (e.g., tables 122 and 124 of FIG. 9). This example is merely illustrative. Snapshot 152 may include any desired switch-specific information that identifies desired states of switches in the network. In other words, snapshot 152 may define a desired network configuration to be implemented.

Figure 13:
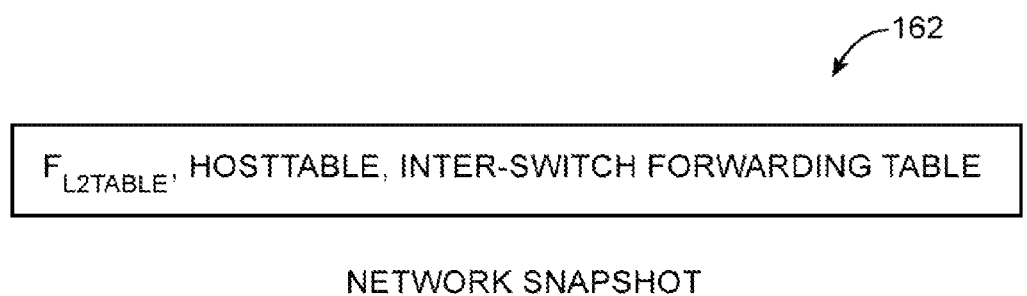
FIG. 13 is a diagram of an illustrative network snapshot that includes a set of tables and a function that operates on the set of tables to produce switch-specific state information in accordance with an embodiment of the present invention.

Application modules may be configured to provide global data constructs in addition to or instead of switch-specific state information to help reduce the amount of storage required at the controller. As shown in FIG. 13, a network snapshot 162 may include a host table and an inter-switch forwarding table (e.g., host table 132 and inter-switch forwarding table 136 of FIG. 10). Network snapshot 162 may include function FL2TABLE that generates switch-specific state information from the global data structures (e.g., FL2TABLE 142 of FIG. 11).

Figure 14:
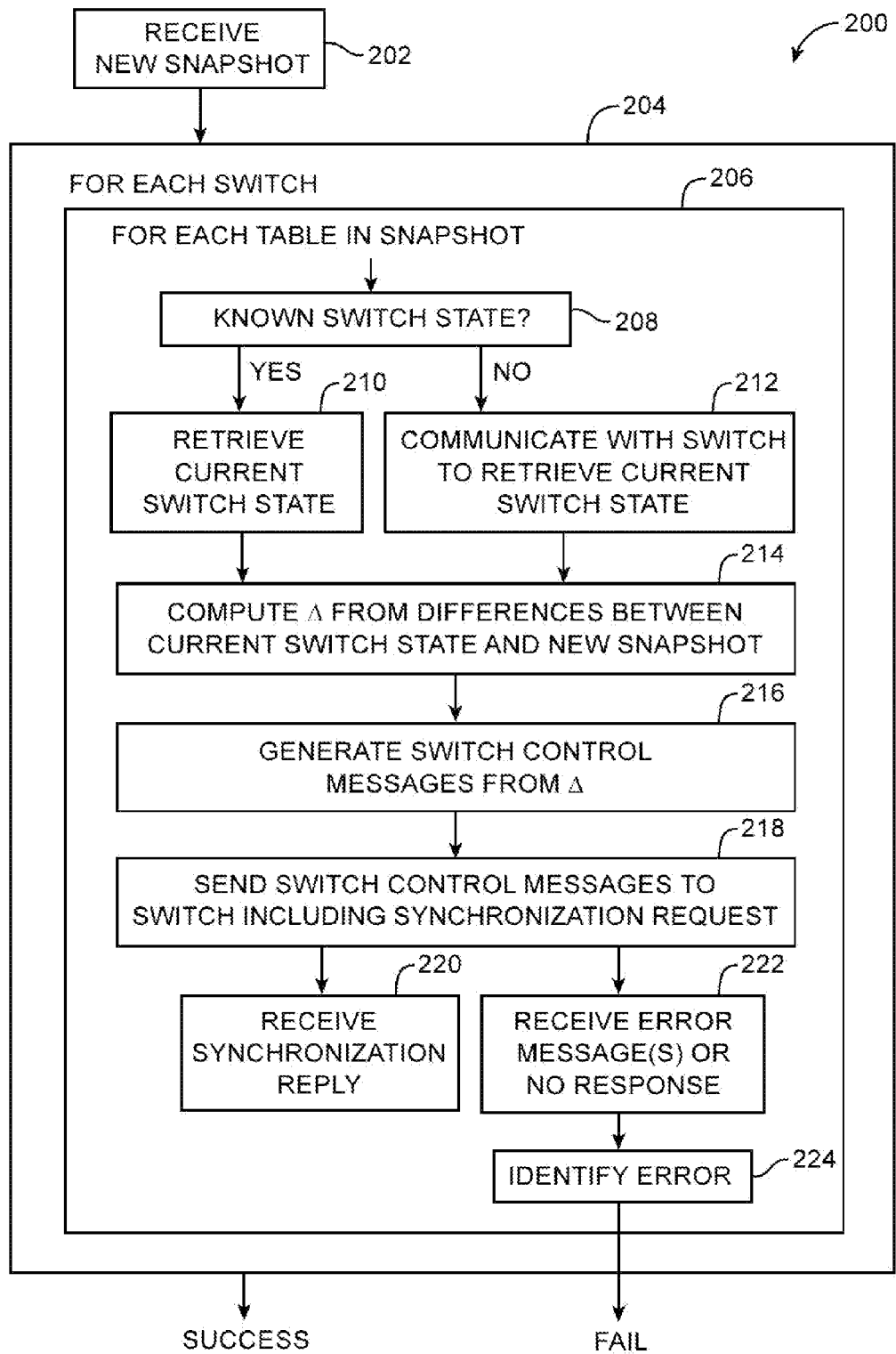
FIG. 14 is a flow chart of illustrative steps that may be performed by a switch modeling interface to generate switch control messages from differences in a desired network snapshot and a current network configuration in accordance with an embodiment of the present invention.

A network snapshot may include only switch-specific state information (e.g., snapshot 152 of FIG. 12), only global state information, or a combination of switch specific and global state information. The information included in a network snapshot identifies a desired state of the network, which may be processed by the switch modeling interface to generate switch control messages for implementing the desired state of the network. FIG. 14 is a flow chart 200 of illustrative steps that may be performed by a switch modeling interface in implementing desired changes to the configuration of a network based on network snapshots.

During step 202, the switch modeling interface may receive a new snapshot indicating desired changes to be made to the configuration of the network (e.g., a desired network configuration). For example, snapshot 152 of FIG. 12 or snapshot 162 of FIG. 13 may be received.

During step 204, the switch modeling interface may perform the operations of step 206 for each switch in the network (e.g., the switch modeling interface may select a switch, perform the operations of step 206 for the selected switch, select additional switch, and so on).

During step 206, the switch modeling interface may perform the operations of step 208-224 for each table (e.g., switch-specific or global construct) in the received snapshot.

During step 208, the switch modeling interface may determine whether the state of the selected switch is known (e.g., the switch selected during step 204 for processing). For example, the switch modeling interface may store information identifying when the information in each switch model 108 was last updated. The information may be stored as a timestamp on each table or on table entries in the switch models. In this scenario, the switch modeling interface may compare the timestamps associated with the selected switch with the current system time. If the difference in time exceeds a threshold, the switch modeling interface may determine that the current state of the selected switch should be updated.

In response to determining that the state of the selected switch is known from the switch models, the current switch state may be retrieved (e.g., from the corresponding switch model 108) during step 210 and the operations of step 214 may be subsequently performed. In response to determining that the state of the selected switch is not known (e.g., the corresponding switch model 108 does not store up-to-date information), the switch modeling interface may communicate with the selected switch to retrieve its current switch state for updating the corresponding switch model before proceeding to step 214. For example, the switch modeling interface may send control messages that direct the switch to respond with requested switch state information (e.g., an L2 forwarding table, an ARP table, etc.). The switch state information received from the switch may be used to update switch models 108.

During step 214, the switch modeling interface may compute the difference (Δ) between the current switch state and the new switch state defined in the received network snapshot. In scenarios in which the network snapshot and/or switch models are defined using a function that operates on global data constructs, the switch modeling interface may compute the switch-specific state information for the selected switch using the function and the global data constructs. The switch-specific information from the switch models and from the received snapshot may be compared directly. Alternatively, global constructs may be compared directly and differences identified in the global constructs may be used to identify differences in the corresponding switch-specific state information.

During step 216, the switch modeling interface may use any computed differences between the current switch state and the new switch state to generate switch control messages that implement the desired new switch state. For example, the switch modeling interface may generate OpenFlow control messages that direct the selected switch to replace one or more current L2 forwarding table entries at the switch with L2 forwarding table entries from the desired switch state.

During step 218, the switch modeling interface may provide the generated switch control messages along with a synchronization request message to the switch. The synchronization request message may direct the switch to provide a synchronization reply message in response to successful processing of the control messages. In other words, if the switch state modifications of the switch control messages are successfully implemented by the switch, the switch must respond with a synchronization reply message that may be received at the switch modeling interface of the controller during step 220. If the switch control messages are not successfully processed at the switch, the switch may provide error messages or may fail to respond to the synchronization request. Error messages that may be received from a switch may identify the type of error that occurred at the switch. For example, an error message may identify that a table at the switch is full and new entries provided in the switch control messages cannot be stored. As another example, an error message may identify that the switch is incapable of performing the operations specified in the control message (e.g., an unsupported operations error). If desired, the control module may maintain a timer that is enabled when switch control messages are sent during step 218. The timer may be configured with a value representative of the time period within which the switch is expected to provide a response (e.g., a synchronization reply or error message). In this scenario, the control module may identify an error in response to expiration of the timer.

The example of FIG. 14 in which switch control messages are sent out upon generation is merely illustrative. If desired, the switch control messages generated during step 216 may be accumulated and sent out in groups. In this scenario, a synchronization request may be sent out for each group of switch control messages and any synchronization reply messages may confirm a successful response for this entire corresponding group.

Figure 15:
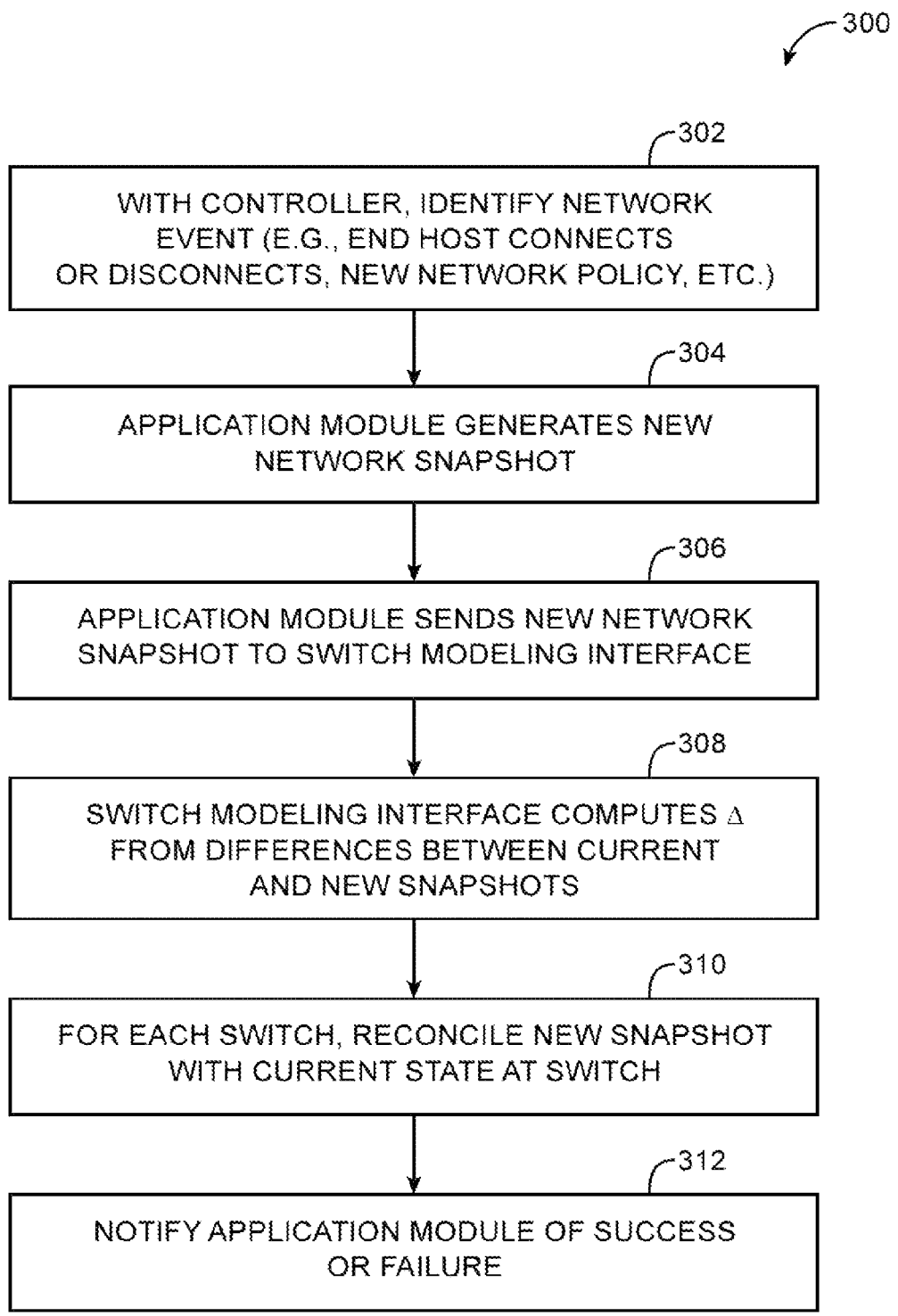
FIG. 15 is a flow chart of illustrative steps that may be performed by a controller in using a switch modeling interface to modify a network configuration in response to a network event in accordance with an embodiment of the present invention.

FIG. 15 is a flow chart 300 of illustrative steps that may be performed by a controller having a switch modeling interface in controlling switches in a network (e.g., performed by controller 18 of FIG. 6).

During step 302, the controller may identify a network event. Network events may be identified or detected based on information received from a switch or from a user such as a network administrator. For example, connection or disconnection of an end host may be identified from a message received from a switch over control paths. As another example, a user may provide a new network policy that identifies a new desired network configuration (e.g., new forwarding table values, link aggregation group assignments, etc.).

During step 304, an application module at the controller may generate a new network snapshot based on the network event (e.g., an application module 102 of FIG. 6). For example, network snapshots such as snapshot 152 of FIG. 12 or snapshot 162 of FIG. 13 may be generated that indicates a desired network configuration in response to the network event. In response to end host disconnecting, an application module may generate a network snapshot that removes the end host from the network configuration. In response to an end host connecting, an application module may generate a network snapshot that adds the end host to the network configuration (e.g., adding the end host to forwarding tables while ensuring that the forwarding table entries satisfy existing network forwarding rules). In response to a new network policy, an application module may generate a network snapshot that applies the network policy to the existing network configuration (e.g., replacing or modifying existing table entries such as forwarding table entries).

During step 306, the application module may send the new network snapshot to the switch modeling interface. During subsequent step 308, the switch modeling interface may compute the difference (Δ) between the current network snapshot and the new snapshot. The current network snapshot may be stored at the controller or may be generated by communicating with the switches. During step 310, the switch modeling interface may, for each switch in the network, reconcile the new snapshot with the current state at the switch to implement the new network snapshot. For example, the switch modeling interface may, in performing steps 308 and 310, perform the steps of flow chart 200 of FIG. 14. During step 312, the switch modeling interface may notify the application module of success or failure in implementing the new network snapshot.

It can be challenging for the switch modeling interface to determine differences Δ between current switch states and a desired new network snapshot. For example, the state at a switch may include hundreds of thousands of table entries. It can be time consuming to transfer these table entries to the controller over control paths and calculate differences Δ. Switches in the network may be provided with hash capabilities that may be used by the controller to help with determining differences between current switch states and desired network snapshots.

Figure 16:
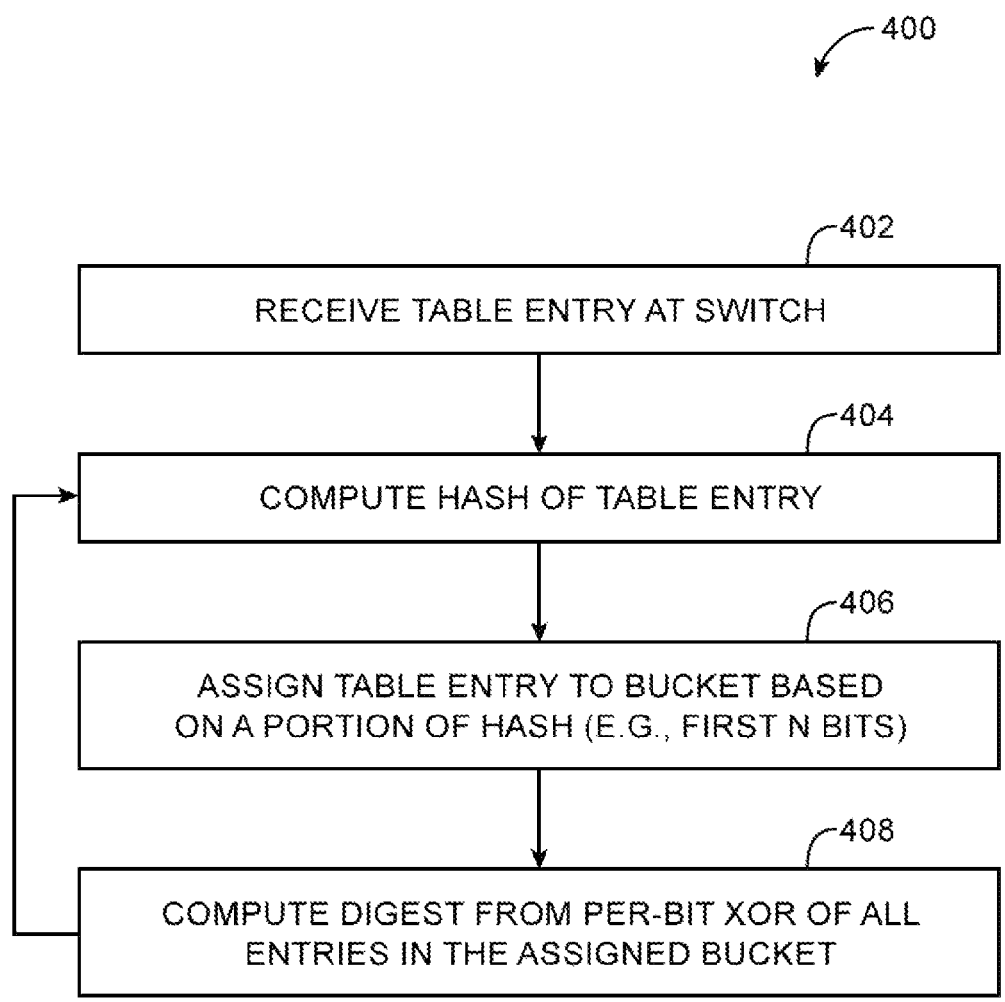
FIG. 16 is a flow chart of illustrative steps that may be performed by a switch to maintain a digest table based on received switch configuration data in accordance with an embodiment of the present invention.

FIG. 16 is a flow chart 400 of illustrative steps that may be performed by a switch in generating digest identifiers from table entries that may help to improve performance of the switch modeling interface at the controller. The steps of flow chart 400 may, for example, be performed by circuitry at control unit 24 of switch 14 of FIG. 1.

During step 402, the switch may receive or otherwise process a table entry such as a forwarding table entry, link aggregation group table entry, address resolution protocol table entry, or other table entry that at least partially defines the configuration of the switch. For example, the table entry may be a flow table entry or a portion of a flow table entry provided by a controller.

During step 404, the switch may compute a hash value for the table entry. The hash may be computed using any desired hashing algorithm. For example, the switch may use the Secure Hashing Algorithm (SHA) on the binary data of the table entry to produce the hash value.

The switch may maintain buckets (e.g., groups of zero or more entries) for organizing the table entries based on the hash values. During step 406, the switch may assign the table entry to a bucket based on a portion of the hash value. For example, the first two, three, four, or any selected N number of bits of the hash may be used in determining which bucket to assign the table entry.

During step 408, the switch may compute a digest value (e.g., a digest identifier) for the assigned bucket. The digest value may be computed by calculating a per-bit logic XOR over all of the entries in the assigned bucket. The switch may store the digest value for the assigned bucket and may, in response to requests from a controller, provide the digest values of the buckets.

Figure 17:
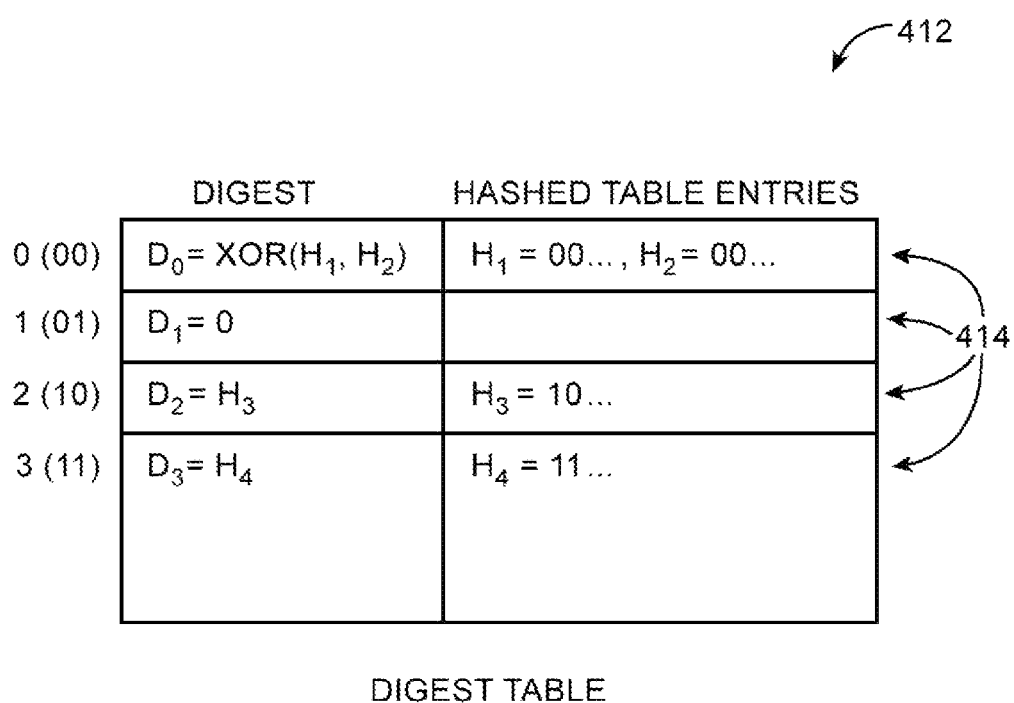
FIG. 17 is an illustrative digest table that may be maintained by a switch based on switch configuration data in accordance with an embodiment of the present invention.

FIG. 17 is a diagram of an illustrative digest table 412 that includes buckets 414. Digest table 412 may be maintained by a switch (e.g., at storage at the switch). Buckets 414 may be assigned table entries based on calculated hash values (e.g., during the operations of flow chart 400 of FIG. 16). In the example of FIG. 17, hashed table entries are assigned to buckets 414 based on the first two bits of the hash values for the hashed table entries. The number of hash value bits associated with each bucket may correspond to the number of buckets.

Each bucket 414 may include zero or more hashed table entries and a digest value calculated from the per-bit XOR of the hashed table entries (e.g., an XOR value of each bit position across all of the hashed table entries is computed to produce a digest value having the same total number of bits as each hashed table entry). Bucket 0 corresponds to a binary value of 00 and may have been assigned hashed table entries H1 and H2 starting with "00." Similarly, bucket 1 (binary 01) may be assigned any entries starting with "01", bucket 2 (binary 10) may be assigned entry H3 that starts with "10", and bucket 3 (binary 11) may be assigned entry H4 that starts with "11."

The digest of bucket 0 may be the XOR of hash values H1 and H2. As an example, hash values H1 and H2 may be the hashed values of the first two L2 forwarding table entries of the table 122 of FIG. 9. The digest of bucket 1 (binary value 01) may be zero, as no table entries have been assigned to bucket 1. Buckets H3 and H4 may have digests equal to respective hash values H3 and H4, as only one table entry has been assigned to each of buckets H3 and H4.

The example of FIG. 17 is which an XOR is computed from the hashed table entries of bucket 414 is merely illustrative. If desired, any logic function such as another hash function may be computed on the entries of each bucket 414 to produce a digest value for that bucket. The logic XOR function may be desirable because any one-bit change in the hashed table entries produces a different digest value. In addition, the digest value may be updated in response to addition or removal of hashed table entries by computing the XOR of the current digest value with the hash value to be added or removed (e.g., it is not necessary to re-compute the digest value from all of the hashed table entries in the bucket).

Figure 18:
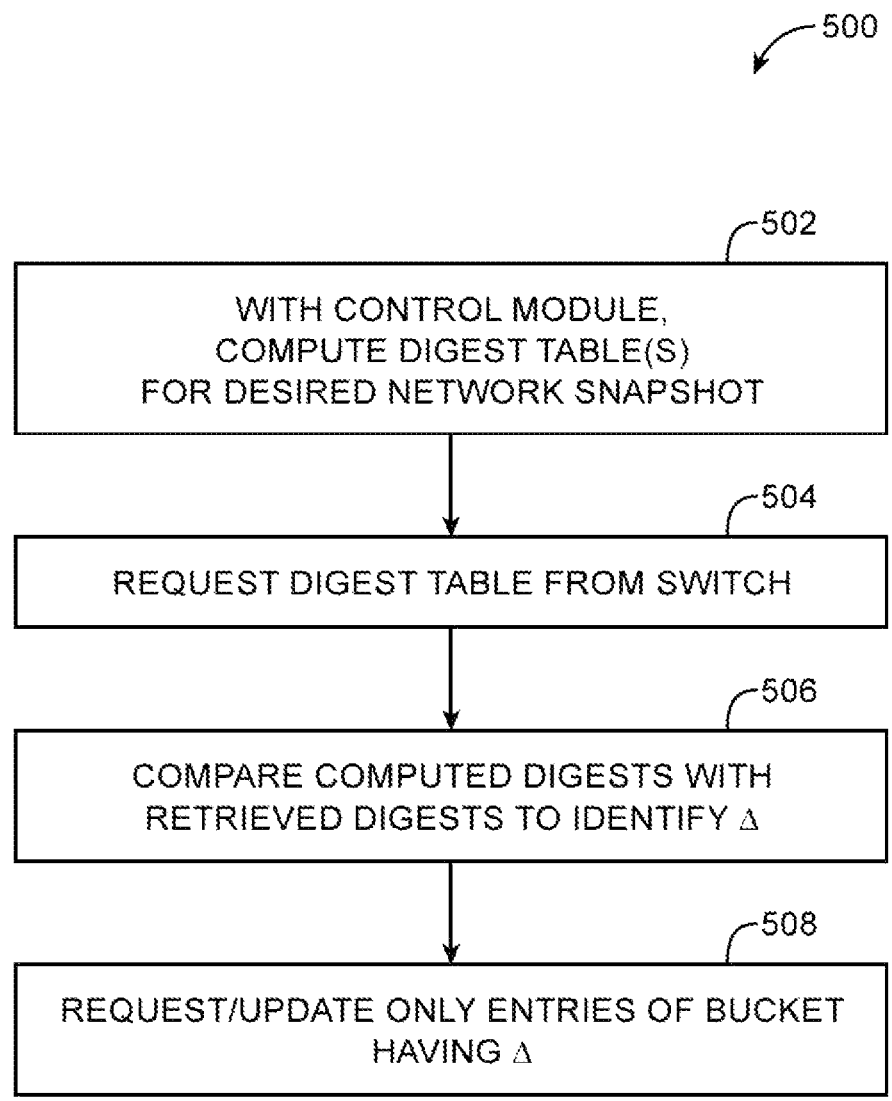
FIG. 18 is a flow chart of illustrative steps that may be performed by a controller in using digest tables maintained by switches to identity differences between a desired network configuration and a current network configuration in accordance with an embodiment of the present invention.

Digest values on network state (e.g., tables such as forwarding tables) maintained by switches may be used in determining whether a network snapshot of a desired network configuration is different from the existing network configuration. FIG. 18 is a flow chart 500 of illustrative steps that may be performed by a switch modeling interface at a controller to use switch-computed digest values in identifying differences between a desired network snapshot and an existing network configuration. The steps of flow chart 500 may, for example, be performed during steps 212 and 214 of FIG. 14 or during step 308 of FIG. 15.

During step 502, a control module at the switch modeling interface may compute one or more digest tables for a desired network snapshot (e.g., a network snapshot received from an application module indicating a desired network configuration for the switches of the network). The control module may compute a digest table for each switch similarly to how that switch computes its own digest table. For example, the control module may perform steps 404-406 of FIG. 16 for each switch using the table entries in the network snapshot that are associated with that switch (e.g., a separate digest table may be computed for each switch in the network).

During step 504, the control module may select a switch and request the digest table maintained by the selected switch (e.g., the digest table maintained by the switch in performing the steps of flow char 400 of FIG. 16).

During step 506, the control module may compare the digest values computed by the controller with the retrieved digest values from the switch to identify differences in the digest values. Buckets of the computed digest table of the selected switch for which the retrieved digest values from the switch are not matching may be identified as requiring updates. Conversely, buckets of the computed digest table of the selected switch that match the retrieved digest values may be identified as not requiring updates.

During step 508, the control module may communicate with the selected switch to retrieve the table entries of only the selected bucket (e.g., the table entries that were used in calculating the hash values assigned to the selected bucket). The control module may compare the retrieved table entries to the desired table entries in the network snapshot and provide corrective table entries to the selected switch that implement the desired network configuration of the network snapshot.

Use of digest values as shown in FIG. 18 to determine what modifications need to be made in implementing a desired network configuration may help to reduce the amount of traffic over control paths between the controller and switches in the network, because only table entries of buckets having non-matching digest values are transferred. By transferring only table entries associated with non-matching digest values, storage resources (e.g., memory) at the controller may be more efficiently utilized, as it is not necessary to store the entire switch state at the controller at any given time.

The foregoing is merely illustrative of the principles of this invention and various modifications can be made by those skilled in the art without departing from the scope and spirit of the invention.

What is claimed is:

1. A method of using a controller that controls switches in a network having end hosts that are coupled to the switches, the method comprising:
with a switch modeling interface at the controller, maintaining switch models of the switches in the network, wherein the switches are separate from the controller;
with a switch modeling interface at the controller, receiving a desired network configuration of the network of switches;
with a switch modeling interface at the controller, generating control messages for the switches to implement the desired network configuration based on the switch models, wherein the desired network configuration received at the switch modeling interfaces comprises a function, a global host table identifying end host attachment points, and a global inter-switch forwarding table; and
with the switch modeling interface, operating the function on the global host table and the global inter-switch forwarding table to produce a switch-specific forwarding table for each of the switches that is separate from the global host table and the global inter-switch forwarding table by applying a series of functions that derive the switch-specific forwarding table for each of the switches from the global host table and the global inter-switch forwarding table, wherein the global host table is separate from the global inter-switch forwarding table.

2. The method defined in claim 1 further comprising:
with the controller, identifying a network event; and
with the controller, generating the desired network configuration based on the network event.

3. The method defined in claim 2 wherein the network event comprises an event selected from the group consisting of: connection of an end host, disconnection of an end host, and a new network policy.

4. The method defined in claim 2 wherein the switch models identify a network configuration, the method further comprising:
with the switch modeling interface, identifying differences between the desired network configuration and the network configuration identified by the switch models, wherein generating the control messages for the switches to implement the desired network configuration based on the switch models comprises:

generating control messages for only the identified differences between the desired network configuration and the network configuration identified by the switch models.

5. The method defined in claim 4 further comprising:
with the switch modeling interface, sending the control messages to the switches; and
with the switch modeling interface, determining whether the control messages were successfully implemented at the switches.

6. The method defined in claim 5 wherein the controller includes a plurality of application modules that control the switches by communicating with the switch modeling interface and wherein generating the desired network configuration based on the network event comprises:
with a given one of the plurality of application modules, generating the desired network configuration; and
with the given application module, providing the desired network configuration to the switch modeling interface.

7. The method defined in claim 6 further comprising:
with the switch modeling interface, providing the given application module with information identifying whether the control messages were successfully implemented at the switches.

8. The method defined in claim 5 wherein determining whether the control messages were successfully implemented at the switches comprises:
providing a synchronization request message to the switches along with the control messages; and
in response to receiving a synchronization reply message from the switches that corresponds to the synchronization request message, determining that the control messages were successfully implemented at the switches.

9. The method defined in claim 8 wherein determining whether the control messages were successfully implemented at the switches further comprises:
in response to receiving an error message from the switches, determining that the control messages were not successfully implemented at the switches.

10. The method defined in claim 4 wherein each switch maintains a digest table having entries that include hashed switch state information, wherein each entry of the digest table includes a digest value calculated from the hashed switch state information of that entry, and wherein identifying differences between the desired network configuration and the network configuration identified by the switch models comprises:
with the controller, computing a set of desired digest tables for the desired network configuration;
with the switch modeling interface, retrieving the digest tables from the switches; and
comparing the desired digest tables computed by the controller to the retrieved digest tables from the switches.

11. A method of operating a network switch that communicates with a controller over network control paths, comprising:
with the network switch, maintaining a digest table having a plurality of buckets, wherein each bucket is associated with a respective digest value;
in response to a request from the controller, with the network switch, sending the respective digest values for the plurality of buckets in the digest table to the controller;
after sending the respective digest values to the controller, with the network switch, receiving switch configuration data from the controller, wherein the switch configuration data is associated with only a portion of the plurality of buckets; and
with the network switch, updating the portion of the plurality of buckets to implement the received switch configuration data, wherein the portion of the plurality of buckets is determined by differences between the received switch configuration data and existing switch configuration data.

12. The method defined in claim 11 further comprising:
with the network switch, hashing the received switch configuration data; and
assigning the hashed switch configuration data to a selected one of the plurality of buckets based on the hashed switch configuration data, wherein the calculated digest value is stored for the selected bucket.

13. The method defined in claim 12 wherein the hashed switch configuration data comprises a plurality of bits and wherein assigning the hashed switch configuration data to the selected one of the plurality of buckets based on the hashed switch configuration data comprises:
selecting the bucket based on a subset of the plurality of bits.

14. The method defined in claim 13 wherein the selected bucket includes previously hashed switch configuration data and wherein updating only a portion of the buckets to implement the received switch configuration data comprises:
computing a logic XOR based on the hashed switch configuration data and the previously hashed switch configuration data in the selected bucket.

15. The method defined in claim 11 wherein the switch configuration data comprises a forwarding table for the switch.

16. A method of using a controller that controls switches in a network having end hosts that are coupled to the switches, the method comprising:
with the controller, maintaining information identifying a current network configuration, wherein the information identifying the current network configuration includes first and second tables and a function that operates on the first and second tables to produce a set of tables that define at least a portion of the current network configuration, wherein the first table is separate from the second table;
with the controller, receiving a desired network configuration;
with the controller, for a given switch in the switches, determine whether a configuration state for the given switch is stored at a switch modeling interface in the controller, wherein the switch modeling interface stores configuration states of the switches controlled by the controller;
with the controller, in response to determining that the configuration state is stored at the controller, retrieving the configuration state from the switch modeling interface; and
with the controller, computing differences between the current network configuration and the desired network configuration based on the retrieved configuration state for the given switch.

17. The method defined in claim 16 wherein the first table is a host table identifying end host attachment points for all of the end hosts and the second table is an inter-switch forwarding table identifying links between the switches, the method further comprising:

with the controller, using the function to generate a per-switch forwarding table for a given one of the switches based on the host table and the inter-switch forwarding table.

18. The method defined in claim 16 further comprising:
with the controller, generating control messages for the given switch to implement the desired network configuration based on the information identifying the current network configuration.

\* \* \* \* \*